US012205738B2

(12) United States Patent
Kim et al.

(10) Patent No.: US 12,205,738 B2
(45) Date of Patent: Jan. 21, 2025

(54) METHOD OF PRODUCING SINTERED MAGNET

(71) Applicant: LG Chem, Ltd., Seoul (KR)

(72) Inventors: Tae Hoon Kim, Daejeon (KR); Soon Jae Kwon, Daejeon (KR); Hyounsoo Uh, Daejeon (KR); Ikjin Choi, Daejeon (KR); Jinhyeok Choe, Daejeon (KR); Ingyu Kim, Daejeon (KR); Eunjeong Shin, Daejeon (KR); Nakheon Sung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 428 days.

(21) Appl. No.: 17/635,801

(22) PCT Filed: Oct. 7, 2020

(86) PCT No.: PCT/KR2020/013643
§ 371 (c)(1),
(2) Date: Feb. 16, 2022

(87) PCT Pub. No.: WO2021/071236
PCT Pub. Date: Apr. 15, 2021

(65) Prior Publication Data

US 2022/0310292 A1 Sep. 29, 2022

(30) Foreign Application Priority Data

Oct. 7, 2019 (KR) ........................ 10-2019-0123870

(51) Int. Cl.
*H01F 1/057* (2006.01)
*B22F 3/10* (2006.01)
(Continued)

(52) U.S. Cl.
CPC .............. *H01F 1/0577* (2013.01); *B22F 3/10* (2013.01); *B22F 3/26* (2013.01); *C22C 1/04* (2013.01);
(Continued)

(58) Field of Classification Search
CPC ...... H01F 1/0577; H01F 41/0253; B22F 3/10; B22F 3/26; B22F 2003/248;
(Continued)

(56) References Cited

U.S. PATENT DOCUMENTS

2014/0105779 A1 4/2014 Nakamura
2015/0093501 A1 4/2015 Nomura et al.
(Continued)

FOREIGN PATENT DOCUMENTS

CN 101944430 A 1/2011
CN 103779035 A 5/2014
(Continued)

OTHER PUBLICATIONS

Search Report dated Sep. 22, 2023 from the Office Action for Chinese Application No. 202080057364.7 issued Sep. 26, 2023, pp. 1-3.
(Continued)

*Primary Examiner* — Brian D Walck
*Assistant Examiner* — Nazmun Nahar Shams
(74) *Attorney, Agent, or Firm* — Lerner David LLP

(57) ABSTRACT

A method of producing a sintered magnet is disclosed herein. In some embodiments, a method of producing a sintered magnet comprises, sintering a R—Fe—B based magnetic powder to produce a sintered magnet; wherein the R is Nd, Pr, Dy, Ce or Tb, and infiltrating a eutectic alloy into the sintered magnet, wherein the eutectic alloy contains Pr, Al, Cu and Ga, and wherein infiltration the eutectic alloy includes applying the eutectic alloy to the sintered magnet
(Continued)

and heat-treating the sintered magnet to which the eutectic alloy is applied.

6 Claims, 3 Drawing Sheets

(51) Int. Cl.

| | |
|---|---|
| ***B22F 3/24*** | (2006.01) |
| ***B22F 3/26*** | (2006.01) |
| ***C22C 1/04*** | (2023.01) |
| ***C22C 28/00*** | (2006.01) |
| ***C22C 38/00*** | (2006.01) |
| ***C22C 38/06*** | (2006.01) |
| ***C22C 38/10*** | (2006.01) |
| ***C22C 38/16*** | (2006.01) |
| ***H01F 41/02*** | (2006.01) |

(52) U.S. Cl.
CPC ............ *C22C 28/00* (2013.01); *C22C 38/005* (2013.01); *C22C 38/06* (2013.01); *C22C 38/10* (2013.01); *C22C 38/16* (2013.01); *H01F 41/0253* (2013.01); *B22F 2003/248* (2013.01); *B22F 2301/355* (2013.01); *B22F 2301/45* (2013.01); *C22C 2202/02* (2013.01)

(58) Field of Classification Search
CPC .. B22F 2301/355; B22F 2301/45; C22C 1/04; C22C 28/00; C22C 38/005; C22C 38/06; C22C 38/10; C22C 38/16; C22C 2202/02; C22C 1/0483
See application file for complete search history.

(56) References Cited

U.S. PATENT DOCUMENTS

| | | | |
|---|---|---|---|
| 2016/0027565 | A1 | 1/2016 | Kano et al. |
| 2016/0086704 | A1 | 3/2016 | Namkung et al. |
| 2016/0314899 | A1 | 10/2016 | Sakuma et al. |
| 2018/0012701 | A1 | 1/2018 | Sagawa et al. |
| 2018/0182515 | A1 | 6/2018 | Ito et al. |
| 2018/0182517 | A1 | 6/2018 | Luo et al. |
| 2019/0292635 | A1 | 9/2019 | In et al. |
| 2020/0143963 | A1 | 5/2020 | Simon et al. |
| 2020/0161047 | A1 | 5/2020 | Zhou et al. |
| 2020/0203068 | A1 | 6/2020 | Choi et al. |

FOREIGN PATENT DOCUMENTS

| | | | |
|---|---|---|---|
| CN | 106887321 | A | 6/2017 |
| CN | 107077940 | A | 8/2017 |
| CN | 107112125 | A | 8/2017 |
| CN | 107492430 | A | 12/2017 |
| JP | H08316014 | A | 11/1996 |
| JP | 2010-098115 | A | 4/2010 |
| JP | 2015082626 | A | 4/2015 |
| JP | 2016-127112 | A | 7/2016 |
| JP | 2018-110162 | A | 7/2018 |
| JP | 6489205 | B2 | 3/2019 |
| JP | 2019-060009 | A | 4/2019 |
| JP | 2019-062153 | A | 4/2019 |
| JP | 2019062154 | A | 4/2019 |
| JP | 2019-527303 | A | 9/2019 |
| KR | 20150033423 | A | 4/2015 |
| KR | 20160012944 | A | 2/2016 |
| KR | 20180068272 | A | 6/2018 |
| KR | 20180096334 | A | 8/2018 |
| KR | 20190056744 | A | 5/2019 |
| KR | 20190062187 | A | 6/2019 |
| WO | 2018192346 | A1 | 10/2018 |
| WO | 2019007499 | A1 | 1/2019 |

OTHER PUBLICATIONS

Extended European Search Report for Application No. 20874004.3 dated Sep. 1, 2022. 7 pgs.
International Search Report for PCTKR2020013643 dated Feb. 2, 2021, 2 pgs.

METHOD OF PRODUCING SINTERED MAGNET

CROSS-REFERENCE TO RELATED APPLICATION(S)

This application is a national phase entry under 35 U.S.C. § 371 of International Application No. PCT/KR2020/013643, filed on Oct. 7, 2020, which claims priority from Korean Patent Application No. 10-2019-0123870, filed on Oct. 7, 2019, the disclosures of which are incorporated by reference herein.

TECHNICAL FIELD

The present disclosure relates to a method of producing a sintered magnet, and more particularly, to a method of producing an R—Fe—B based sintered magnet.

BACKGROUND ART

A NdFeB based magnet is a permanent magnet having a composition of $Nd_2Fe_{14}B$ which is a compound of neodymium (Nd) as a rare earth element, iron and boron (B), and has been used as a universal permanent magnet for 30 years since it was developed in 1983. The NdFeB based magnet is used in various fields such as electronic information, automobile industry, medical equipment, energy, and transportation. Particularly, keeping up with a recent weight lightening and downsizing trend, the NdFeB based magnet is used in products such as craft tools, electronic information appliance, electrical home appliance, mobile phones, robot motors, wind power generators, small motors for automobiles, and drive motors.

As general production of the NdFeB based magnet, a strip/mold casting or melt spinning method based on melt powder metallurgy is known. First, a strip/mold casting method is a process of melting a metal such as neodymium (Nd), iron (Fe), and boron (B) by heating to produce an ingot, coarsely pulverizing crystal grain particles, and producing micro particles by a refining process. These processes are repeated to obtain a magnet powder, which is subjected to pressing and sintering under a magnetic field to produce an anisotropic sintered magnet.

In addition, a melt spinning method is melting metal elements, pouring the melt to a wheel rotating at a high speed to quench the melt, performing jet mill pulverization, and then performing blending into a polymer to form a bond magnet or performing pressing to produce a magnet.

However, there are problems in that these methods all essentially require pulverizing process, it takes a long time to perform the pulverizing process, and a process of coating a powder surface after pulverization is required.

Recently, a method of producing a magnetic powder by a reduction-diffusion process has received attention. In the reduction-diffusion method, a rare earth oxide such as $Nd_2O_3$ is mixed with Fe, B, and Cu powder in a desired composition ratio, to which a reducing agent such as Ca or $CaH_2$ is then added and heat-treated to synthesize a NdFeB based bulk magnet. A sintered magnet can be produced by pulverizing this synthetic product to prepare a magnet powder, and then sintering the magnet powder.

The process of producing a sintered magnet by sintering the magnet powder produced by the reduction-diffusion method may cause the growth of crystal grains when sintering is performed at a temperature ranging from 1000 to 1250 degrees Celsius. The growth of the crystal grains functions as a factor for reducing the coercive force or residual magnetization.

Therefore, a post-treatment method for improving the magnetic performance of the sintered magnet has been proposed.

As one of the post-treatment methods, a grain boundary diffusion process (GBDP) is a method in which the surface of the sintered magnet is coated with a heavy rare earth element and then heat-treated by utilizing the advantage that the chemical reactivity on the grain boundary in the sintered magnet is very large. The grain boundary diffusion method is intended to obtain a high coercive force by concentrically distributing the heavy rare earth element around the grain boundary, that is, only on the surface of ferromagnetic crystal grains, and thus forming a core-shell structure in which the crystal grains are surrounded by a layer with high magnetic anisotropy.

Next, an infiltration treatment, which is one of the other post-treatment methods, is a method in which, in order to allow the fine pores and grain boundary of the sintered magnet to compose of a metal or alloy having a lower melting point, the metal or alloy is applied to the sintered magnet and then heat-treated. This infiltration treatment is intended to obtain the effect of increasing the coercive force by forming a non-magnetic grain boundary composed of a rare earth element-low melting point metal.

However, conventionally, heavy rare earth elements such as Tb and Dy have been used in the grain boundary diffusion process or the melting process, but there are disadvantages in that the heavy rare earth elements have a high melting point and thus have a limit to the penetration into the magnet, and further are very expensive.

DETAILED DESCRIPTION OF THE INVENTION

Technical Problem

Embodiments of the present disclosure have been designed to solve that above-proposed problems, and an object of the present disclosure is to provide a novel grain boundary diffusion material capable of improving a coercive force through post-treatment while being inexpensive.

However, the problem to be solved by the exemplary embodiments of the present disclosure is not limited to the above, and can be variously expanded within the scope of the technical idea included in the present disclosure.

Technical Solution

An exemplary embodiment of the present disclosure provides a method of producing a sintered magnet including the steps of: producing an R—Fe—B based magnet powder; sintering the R—Fe—B based magnetic powder to produce a sintered magnet; producing an eutectic alloy containing Pr, Al, Cu and Ga; and infiltrating the eutectic alloy to the sintered magnet, wherein the R is Nd, Pr, Dy, Ce or Tb, and wherein the infiltration step comprises a step of applying the eutectic alloy to the sintered magnet and a step of heat-treating the sintered magnet to which the eutectic alloy is applied.

The heat treatment step may include a step of heating to 500 to 1000 degrees Celsius. The heat treatment step may include a primary heat treatment step of heating to 800 to 1000 degrees Celsius and a secondary heat treatment step of heating to 500 to 600 degrees Celsius.

The step of producing an R—Fe—B-based magnet powder may include a step of synthesizing the R—Fe—B based magnet powder by a reduction-diffusion method.

The Ga content in the eutectic alloy may be 1 to 20 at %.

The step of producing the eutectic alloy may include: a step of mixing $PrH_2$, Al, Cu and Ga to produce a eutectic alloy mixture, a step of pressing the eutectic alloy mixture by a cold isostatic pressing method, and a step of heating the pressed eutectic alloy mixture.

The R—Fe—B based magnet powder may include an NdFeB based magnet powder.

Advantageous Effects

According to the exemplary embodiments of the present disclosure, by applying the eutectic alloy with a low melting point to the surface of the sintered magnet and then heat-treating it, the coercive force of the sintered magnet can be effectively increased even if a heavy rare earth element is not used or its use amount is minimized.

DETAILED DESCRIPTION OF THE EMBODIMENTS

Figure 1:
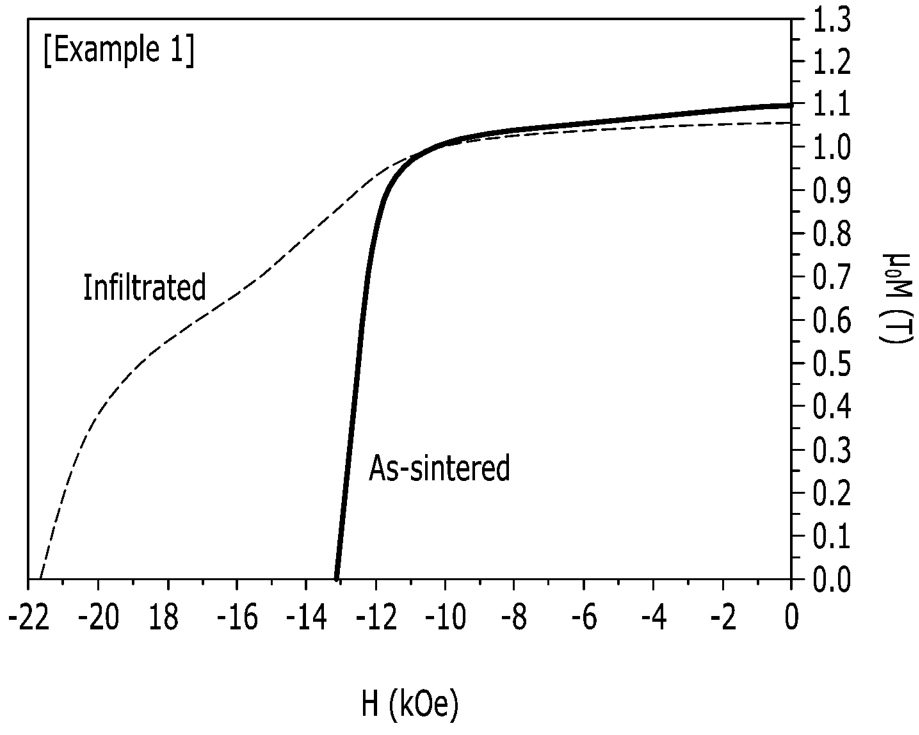
FIG. 1 is a B-H graph measured on the sintered magnet produced in Example 1.

Hereinafter, various exemplary embodiments of the present disclosure will be described in detail with reference to the accompanying drawings, so that those skilled in the art can easily carry out the invention. The present disclosure may be implemented in various different ways, which is not limited to the exemplary embodiments set forth herein.

In addition, throughout the specification, when an element "includes" a component, it may indicate that the element does not exclude another component, but can further include another component, unless referred to the contrary.

According to an exemplary embodiment of the present disclosure, there is provided a method of producing a sintered magnet including the steps of: producing an R—Fe—B based magnet powder; sintering the R—Fe—B based magnetic powder to produce a sintered magnet; producing an eutectic alloy containing Pr, Al, Cu and Ga; and infiltrating the eutectic alloy to the sintered magnet.

The infiltration step includes a step of applying the eutectic alloy to the sintered magnet and a step of heat-treating the sintered magnet to which the eutectic alloy is applied.

The R refers to a rare earth element, and may be Nd, Pr, Dy, Ce or Tb. That is, R described below refers to Nd, Pr, Dy, Ce or Tb.

Then, more detail will be given for each step below.

First, the step of infiltrating to the sintered magnet will be described in detail.

As a post-treatment method, the conventional grain boundary diffusion process (GBDP) or infiltration treatment uses heavy rare earth elements such as Tb or Dy, but there is the disadvantage in that the heavy rare earth elements have a high melting point and thus has a limit to the penetration into the magnet and the diffusion of grain boundary, and further are expensive.

In contrast, in this exemplary embodiment, since the surface of the sintered magnet is infiltrated using a eutectic alloy having a low melting point, the grain boundary diffusion or the penetration into the magnet can be performed more smoothly. Therefore, it is possible to efficiently improve the coercive force of the sintered magnet while minimizing the use amount of the heavy rare earth element or without using it.

In particular, the sintered magnet of the present disclosure can be produced by sintering the magnetic powder produced by a reduction-diffusion method.

At this time, when sintering the magnetic powder produced by the reduction-diffusion method, in the process of sintering, crystal grain growth (more than 1.5 times the size of the initial powder) or abnormal crystal grain growth (more than twice the size of the normal crystal grain) may occur. Thus, there is a problem that the crystal grain size distribution of the sintered magnet is not uniform, and magnetic performance such as coercive force or residual magnetization is deteriorated.

When the infiltration was performed using an eutectic alloy containing Pr, Al, Cu and Ga according to this exemplary embodiment, it was confirmed that the coercive force was improved by about 8 kOe (kilo oersted). This shows that the coercive force has increased by about 30% to 70% as compared with the as-sintered, and even though heavy rare earth elements were not added, the coercive force was highly improved in a level comparable thereto.

In particular, when the magnetic powder is produced by a reduction-diffusion method, it is possible to make the magnetic powder finer than the conventional method, whereby the sintered magnet produced by sintering the magnetic powder may be formed to have a slightly low density. Therefore, when the target to be infiltrated according to this exemplary embodiment is a sintered magnet obtained by sintering the magnetic powder produced by a reduction-diffusion method, the effect of grain boundary diffusion or the effect of improving coercive force may be more excellent due to the low density of the sintered magnet.

The step of applying the eutectic alloy to the sintered magnet may include the steps of applying an adhesive material to the surface of the sintered magnet, dispersing the pulverized eutectic alloy in the adhesive material, and then drying the adhesive material. This allows the eutectic alloy to be applied and attached to the surface of the sintered magnet.

Meanwhile, the adhesive material may be a mixture of polyvinyl alcohol (PVA), ethanol, and water.

Then, the heat treatment step is followed. The heat treatment step may include a step of heating to 500 to 1000 degrees Celsius.

More specifically, the heat treatment step may include a primary heat treatment step and a secondary heat treatment step. The primary heat treatment step may include a step of heating to 800 to 1000 degrees Celsius, and the secondary heat treatment step may include a step of heating to 500 to 600 degrees Celsius.

Through the primary heat treatment step, melting of the eutectic alloy containing Pr, Al, Cu and Ga is induced, and the penetration into the sintered magnet can be smoothly performed.

Next, through the secondary heat treatment step, a phase transformation of the R-rich phase due to Pr, Al, Cu, Ga, etc. diffused into the sintered magnet can be induced, thereby enabling additional improvement of the coercive force.

Meanwhile, the eutectic alloy in this exemplary embodiment includes Ga, and by infiltrating the eutectic alloy, a nonmagnetic phase can be formed on the grain boundary of the sintered magnet.

Specifically, since the crystal grain of the R—Fe—B based sintered magnet is much larger than the size of the single domain, and there is almost no histological change in the inside of the grain, the coercive force varies depending on the ease of the reverse domain generation and movement at the grain boundary. In other words, when the reverse domain generation and movement occur easily, the coercive force is low. If it is the opposite, the coercive force is high.

Because the coercive force of the R—Fe—B based sintered magnet as described above is determined by the physical and histological characteristics at the grain boundary region, the coercive force can be improved by suppressing the reverse domain generation and movement at this region.

Thus, if the eutectic alloy containing Ga is applied to the sintered magnet and then heat-treated as in this exemplary embodiment, the nonmagnetic phase can be effectively formed at the grain boundaries of the sintered magnet. An $Nd_6Fe_{13}Ga$ phase may be formed due to the addition of Ga. Thereby, the Fe content in the Nd-rich phase is significantly reduced, and the nonmagnetic properties of the Nd-rich phase are improved. Finally, the residual magnetic flux density of the sintered magnet is maintained without deterioration, the coercive force is improved, and the effect of increasing magnetic performance can be obtained.

Further, Al and Cu added together may help to enhance the effect due to the addition of Ga as described above. Nonmagnetic Al and Cu are additionally penetrated onto Nd-rich phase whose Fe content has been drastically reduced due to the presence of Ga, thereby further improving the nonmagnetic properties of the Nd-rich phase and further increasing the coercive force.

Moreover, each of Al, Cu, and Ga can form eutectic reaction with Pr added together, thereby lowering the melting point of Pr. Thereby, the penetration of the eutectic alloy into the magnet can be further facilitated as compared with the case where the raw materials are not added.

Meanwhile, it is preferable that the content of Ga is 1 to 20 at % relative to the eutectic alloy. If the content of Ga is more than 20 at %, the R—Fe—Ga phase is excessively formed, which can adversely affect the magnetic performance of the sintered magnet. If the content of Ga is less than 1 at %, there is a problem that the nonmagnetic phase of the sintered magnet is not formed as much as intended, and thus, the effect of improving the coercive force is insufficient.

Next, the step of producing an eutectic alloy used for the infiltration will be described.

The step of producing the eutectic alloy may include a step of mixing $PrH_2$, Al, Cu and Ga to prepare a eutectic alloy mixture, a step of pressing the eutectic alloy mixture by a cold isostatic pressing method, and a step of heating the pressed eutectic alloy mixture.

$PrH_2$, Al, and Cu can be mixed in a powder form, and Ga with a low melting point can be mixed in a liquid phase.

Thereafter, the eutectic alloy mixture may be pressed by a cold isostatic pressing (CIP) method.

The cold isostatic pressing method is a process for uniformly applying pressure to the powder, and a process of encapsulating and sealing the eutectic alloy mixture in a plastic container such as a rubber bag, and then applying hydraulic pressure.

Thereafter, the step of heating the pressed eutectic alloy mixture may be followed. Specifically, the pressed eutectic alloy mixture is wrapped in a foil of Mo or Ta metal, and the temperature is raised to 300 degrees Celsius per hour in an inert atmosphere such as Ar gas, and heated to 900 degrees Celsius to 1050 degrees Celsius. The heating may be performed for about 1 hour to 2 hours.

After pulverizing the eutectic alloy thus produced, it can be used in the infiltration step described above.

The above-mentioned method has the advantage in that by pressing and agglomerating the above mixture and then immediately melting it, the eutectic alloy in which the component raw materials are uniformly distributed can be produced by a simple method.

Meanwhile, in order to complement the improvement of the coercive force in the infiltration, $DyH_2$, that is, heavy rare earth hydride powder, may be further added to the eutectic alloy mixture, so that the eutectic alloy may further include Dy.

Next, the step of producing an R—Fe—B based magnet powder is described.

In this exemplary embodiment, an R—Fe—B based magnet powder can be synthesized by a reduction-diffusion method. The reduction-diffusion method is a method in which a rare earth oxide, iron, boron and a reducing agent are mixed and then heated to reduce the rare earth oxide and at the same time, synthesize $R_2Fe_{14}B$ powders.

The rare earth oxide may include at least one of $Nd_2O_3$, $Pr_2O_3$, $Dy_2O_3$, $Ce_2O_3$ and $Tb_2O_3$ in correspondence with the rare earth element R, and the reducing agent may include at least one of Ca, $CaH_2$ and Mg.

The reduction-diffusion method uses a rare earth oxide as a raw material and thus is inexpensive. And the reduction-diffusion method does not require a separate pulverizing process or surface treatment process such as coarse pulverization, hydrogen crushing or jet milling.

In addition, in order to improve the magnetic performance of the sintered magnet, it is essential to refine the crystal grains of the sintered magnet, wherein the size of the crystal grain of the sintered magnet is directly related to the size of the initial magnet powder. At this time, the reduction-diffusion method has an advantage in that it is easy to produce a magnet powder having fine magnetic particles as compared with other methods.

Specifically, the production of the R—Fe—B based magnetic powder according to the reduction-diffusion method includes a synthesis step from a raw material and a cleaning step.

The synthesis step from raw materials may include a step of mixing rare earth oxide, boron and iron to produce a primary mixture, a step of adding and mixing a reducing agent such as calcium to the primary mixture to prepare a secondary mixture, and a step of heating the secondary mixture to a temperature of 800 to 1100 degrees Celsius.

The synthesis is a process of mixing raw materials such as rare earth oxides, boron and iron, reducing and diffusing the raw materials at a temperature of 800 to 1100 degrees Celsius to form a R—Fe—B based alloy magnet powder.

Specifically, when the powder is produced from a mixture of rare earth oxide, boron, and iron, the molar ratio of rare earth oxide, boron, and iron may be between 1:14:1 and 1.5:14:1. Rare earth oxides, boron and iron are raw materials for producing $R_2Fe_{14}B$ magnet powder. When the molar ratio is satisfied, $R_2Fe_{14}B$ magnet powder can be produced in a high yield. If the molar ratio is less than 1:14:1, there is a problem that the composition of the $R_2Fe_{14}B$ main phase is deviated and the R-rich grain boundary phase is not formed. When the molar ratio is greater than 1.5:14:1, there may be a problem that the amount of rare earth elements is excessive and thus the reduced rare earth elements remain, and the remaining rare earth elements are changed to $R(OH)_3$ or $RH_2$.

The heating is for synthesis, and can be performed for 10 minutes to 6 hours at a temperature of 800 to 1100 degrees Celsius in an inert gas atmosphere. When the heating time is less than 10 minutes, the powder is not sufficiently synthesized, and when the heating time is more than 6 hours, there may be a problem that the size of the powder becomes coarse and the primary particles is agglomerated together.

The magnetic powder thus produced may be $R_2Fe_{14}B$. Further, the size of the produced magnetic powder may be 0.5 micrometers to 10 micrometers. Further, the size of the magnetic powder produced according to one exemplary embodiment may be 0.5 micrometers to 5 micrometers.

That is, $R_2Fe_{14}B$ magnet powder is formed by heating the raw material at a temperature of 800 to 1100 degrees Celsius, and the $R_2Fe_{14}B$ magnet powder is a neodymium magnet and exhibits excellent magnetic properties. Typically, in order to form the $R_2Fe_{14}B$ magnet powder such as $Nd_2Fe_{14}B$, the raw material is melted at a high temperature of 1500 to 2000 degrees Celsius, and then rapidly cooled to form lumps of raw materials, and these lumps are coarsely pulverized, hydrogen crushed, etc. to obtain a $R_2Fe_{14}B$ magnet powder.

However, in the case of such a method, a high temperature for melting the raw material is required, and a process of cooling and then pulverizing the raw material is required, and thus, the process time is long and complicated. Further, a separate surface treatment process is required in order to enhance the corrosion resistance and improve electric resistance for the coarsely pulverized $R_2Fe_{14}B$ magnet powder.

However, when R—Fe—B based magnetic powder is produced by the reduction-diffusion method as in this exemplary embodiment, raw materials are reduced and diffused at a temperature of 800 to 1100 degrees Celsius to form a $R_2Fe_{14}B$ magnet powder. In this step, since the size of the magnetic powder is formed in units of a few micrometers, no separate pulverization process is required.

Further, subsequently, in the case of the process of sintering magnet powder to obtain a sintered magnet, the growth of crystal grains is necessarily accompanied when sintering is performed in the temperature range of 1000 to 1100 degrees Celsius. The growth of the crystal grain acts as a factor that reduces the coercive force. The size of the crystal grain of the sintered magnet is directly related to the size of the initial magnet powder, and therefore, if the average size of the magnetic powder is adjusted to 0.5 micrometers to 10 micrometers as in the magnetic powder according to one exemplary embodiment of the present disclosure, a sintered magnet having an improved coercive force can be produced thereafter.

Further, it is possible to adjust the size of the alloy powder produced by adjusting the size of the iron powder used as the raw material.

However, when the magnetic powder is produced by this reduction-diffusion method, by-products such as calcium oxide or magnesium oxide may be generated in the production process, and a cleaning step for removing them is required.

In order to remove such by-products, a cleaning step of immersing the produced magnetic powder in an aqueous solvent or a non-aqueous solvent and cleaning it is followed. This cleaning can be repeated two or more times.

The aqueous solvent may include deionized water (DI water), and the non-aqueous solvent may include at least one of methanol, ethanol, acetone, acetonitrile, and tetrahydrofuran.

Meanwhile, in order to remove by-products, ammonium salt or acid may be dissolved in an aqueous solvent or a non-aqueous solvent. Specifically, at least one of $NH_4NO_3$, $NH_4Cl$, and ethylenediaminetetraacetic acid (EDTA) may be dissolved.

Thereafter, the step of sintering the R—Fe—B based magnet powder that has undergone the synthesis step and the cleaning steps as described above is followed.

The R—Fe—B based magnet powder and the rare earth hydride powder can be mixed to prepare a mixed powder. The rare earth hydride powder is preferably mixed in an amount of 3 to 15 wt. % relative to the mixed powder.

When the content of the rare earth hydride powder is less than 3 wt. %, there may be a problem that sufficient wettability between the particles is not imparted, so sintering is not performed well, and the role of inhibiting the decomposition of R—Fe—B main phase is not sufficiently performed. Further, when the content of rare earth hydride powder is more than 15 wt. %, there may be a problem that the volume ratio of the R—Fe—B main phase in a sintered magnet is reduced, the value of the residual magnetization is reduced, and particles are excessively grown by liquid phase sintering. When the size of the crystal grains increases due to overgrowth of the particles, it is vulnerable to magnetization reversal and thus, the coercive force is reduced.

Next, the mixed powder is heated at a temperature of 700 to 900 degrees Celsius. In this step, the rare earth hydride is separated into rare earth metal and hydrogen gas, and hydrogen gas is removed. That is, in one example, when the rare earth hydride powder is $NdH_2$, $NdH_2$ is separated into Nd and $H_2$ gas, and $H_2$ gas is removed. That is, heating at 700 to 900 degrees Celsius is a process of removing hydrogen from the mixed powder. At this time, heating may be performed in a vacuum atmosphere.

Next, the heated mixed powder is sintered at a temperature of 1000 to 1100 degrees Celsius. At this time, the step of sintering the heated mixed powder at a temperature of 1000 to 1100 degrees Celsius may be performed for 30 minutes to 4 hours. This sintering step can also be performed in a vacuum atmosphere. More specifically, the mixed powder heated at 700 degrees to 900 degrees Celsius can be placed in a graphite mold, compressed, and oriented by applying a pulsed magnetic field to produce a molded body for a sintered magnet. The molded body for sintered magnets is heat-treated at 800 to 900 degrees Celsius in a vacuum atmosphere, and then sintered at a temperature of 1000 to 1100 degrees Celsius to produce a sintered magnet.

In this sintering step, liquid phase sintering by rare earth elements is induced. That is, liquid phase sintering by a rare earth element occurs between the R—Fe—B based magnet powder produced by the conventional reduction-diffusion method and the added rare earth hydride powder. Through this, the R-rich and $RO_x$ phases are formed in the grain boundary region inside the sintered magnet or the grain boundary region of the main phase grains of the sintered magnet. The R-rich region or $RO_x$ phase thus formed improves the sintering capability of the magnetic powder and prevents decomposition of the main phase particles in the sintering process for producing a sintered magnet. Therefore, the sintered magnet can be stably produced.

The produced sintered magnet has a high density, and the size of the crystal grains may be 1 micrometer to 10 micrometers.

Then, the method of producing a sintered magnet according to the exemplary embodiment of the present disclosure will be described below with reference to specific examples and comparative examples.

Example 1

104.975 g of $Nd_2O_3$, 54.368 g of $Pr_2O_3$, 294.75 g of Fe, 0.45 g of Cu, 13.5 g of Co, 4.95 g of B, 1.35 g of Al, 91.5 g of Ca and 9 g of Mg were uniformly mixed to prepare a mixture.

The mixture was placed in a frame of an arbitrary shape and tapped, and then the mixture was heated in an inert gas (Ar, He) atmosphere at 900 degrees Celsius for 30 minutes to 6 hours, and reacted in a tube electric furnace. After the reaction was completed, a ball mill process was performed with zirconia balls in a dimethyl sulfoxide solvent.

Next, a cleaning step was performed to remove Ca and CaO, which are reduction by-products. 30 g to 35 g of $NH_4NO_3$ was uniformly mixed with the synthesized powder, and put in ~200 ml of methanol, and homogenizer and ultrasonic cleaning were alternatively once or twice for effective cleaning. Next, in order to remove $Ca(NO)_3$, which is a reaction product of residual CaO and $NH_4NO_3$, with the same amount of methanol, the mixture was rinsed 2-3 times with methanol or deionized water. The oxide layer on the surface of the magnet powder was removed using methanol and acetic acid solution, and finally, after rinsing with acetone, vacuum drying was performed to complete the cleaning, thereby obtaining single phase $Nd_2Fe_{14}B$ powder particles.

Thereafter, 5 to 10 wt. % of $NdH_2$ was added to the magnetic powder, mixed, and then placed in a graphite mold and subjected to compression molding. The powder was oriented by applying a pulsed magnetic field of 5 T or more to produce a molded body for a sintered magnet. Thereafter, the molded body was heated in a vacuum sintering furnace at a temperature of 850 degrees Celsius for 1 hour, heated at a temperature of 1070 degrees Celsius for 2 hours, and sintered, thereby producing a sintered magnet. The weight ratio (wt. %) of the produced sintered magnet was Nd 20 wt. %, Pr 10 wt. %, Fe 65.5 wt. %, B 1.1 wt. %, Co 3.0 wt. %, Cu 0.1 wt. %, and Al 0.3 wt. %.

Next, for the production of eutectic alloy, 88.4 g of $PrH_2$, 4.7 g of Al, 5.6 g of Cu, and 3.1 g of liquid Ga were mixed to prepare an eutectic alloy mixture, and the mixture was agglomerated by cold isostatic pressing. That is, the eutectic alloy mixture was sealed in a plastic container and sealed, and then hydraulic pressure was applied. Thereafter, the mixture was wrapped in Mo or Ta metal foil, and the temperature was raised to 300 degrees Celsius per hour in an inert atmosphere such as Ar gas and heated to 900 degrees Celsius to 1050 degrees Celsius. The heating can be proceeded for about 1 hour to 2 hours. Finally, the produced eutectic alloy was pulverized into a size suitable for infiltration. The eutectic alloy thus produced was 66.7 at % of Pr, 19 at % of Al, 9.5 at % of Cu, and 4.8 at % of Ga.

Finally, the step of infiltrating the sintered magnet was performed. An adhesive material in which polyvinyl alcohol (PVA), ethanol, and water were mixed was applied to the surface of the produced sintered magnet. The pulverized eutectic alloy was dispersed on the surface of the sintered magnet in an amount of 1 to 10 wt. % relative to the sintered magnet, and then the adhesive material was dried using a heat gun or an oven to allow the eutectic alloy to well adhere to the surface of the sintered magnet.

For the primary heat treatment, these sintered magnets were heated in a vacuum at 800 to 1000 degrees Celsius for 4 to 20 hours. Next, for the secondary heat treatment, they were heated at 500° C. to 600° C. for 1 hour to 4 hours.

Example 2

An eutectic alloy was produced in the same manner as in Example 1 by using 85.74 g of $PrH_2$, 4.6 g of Al, 5.4 g of Cu, and 6.0 g of liquid Ga. The eutectic alloy thus produced was Pr 63.6 at %, Al 18.2 at %, Cu 9.1 at %, and Ga 9.1 at %.

The sintered magnet produced in the same manner as in Example 1 was infiltrated in the same manner as in Example 1 by using the eutectic alloy.

Comparative Example 1

An eutectic alloy was produced in the same manner as in Example 1 by using 89.4 g of $PrH_2$, 4.9 g of Al, and 5.8 g of Cu. The eutectic alloy thus produced was Pr 70 at %, Al 20 at %, and Cu 10 at %.

The sintered magnet produced in the same manner as in Example 1 was infiltrated in the same manner as in Example 1 by using the eutectic alloy.

Evaluation Example

Figure 2:
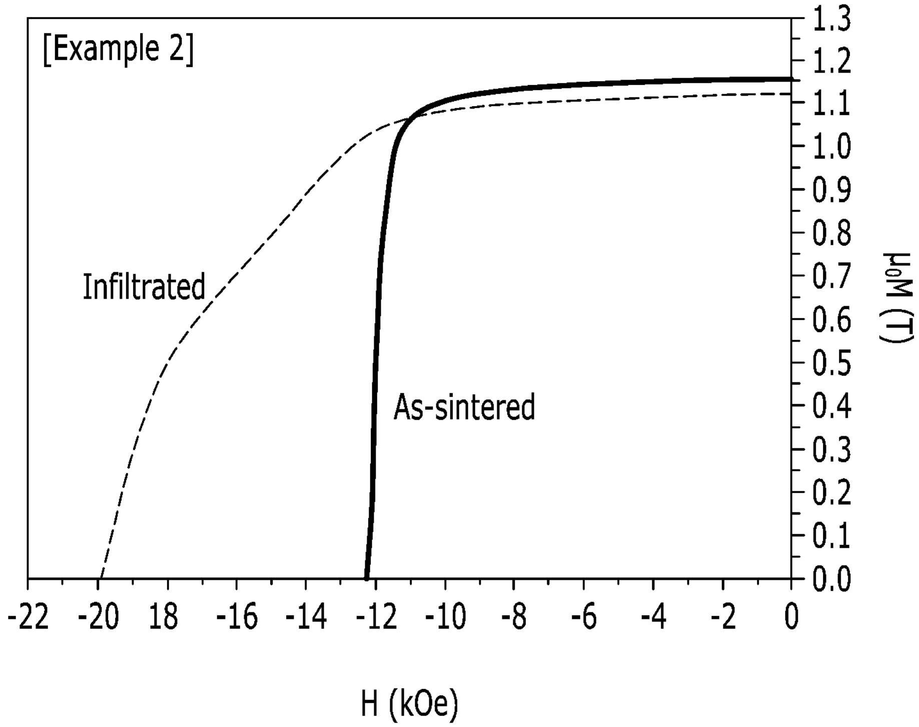
FIG. 2 is a B-H graph measured on the sintered magnet produced in Example 2.
Figure 3:
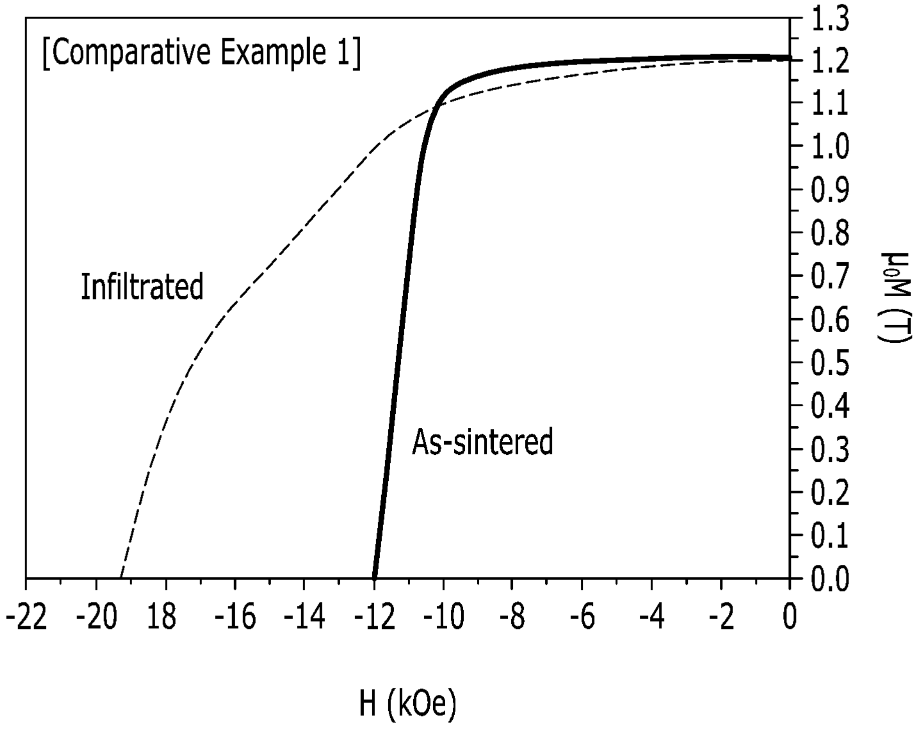
FIG. 3 is a B-H graph measured on the sintered magnet produced in Comparative Example 1.

FIGS. 1 to 3 are B-H graphs measured on the sintered magnets produced in Example 1, Example 2, and Comparative Example 1, respectively.

First, referring to FIG. 1, in the case of the sintered magnet of Example 1, it can be confirmed that the coercive force of Infiltrated was improved by about 70% as compared with As-sintered.

Next, referring to FIG. 2, in the case of the sintered magnet of Example 2, it can be confirmed that the coercive force of Infiltrated was improved by about 70% as compared with As-sintered.

In contrast, referring to FIG. 3, in the case of the sintered magnet of Comparative Example 1, it can be confirmed that the coercive force of Infiltrated was improved by about 60% as compared with As-sintered. That is, it can be confirmed that the coercive force was increased, but the increase width was lower than in Examples 1 and 2 using the eutectic alloy further containing Ga.

Although the preferred exemplary embodiments of the present disclosure have been described in detail above, it is to be understood that the scope of the present disclosure is not limited to the disclosed embodiments, and various modifications and improvements can be made by those skilled in the art using the basic concepts of the present disclosure, without departing from the spirit and scope of the appended claims.

The invention claimed is:

1. A method of producing a sintered magnet comprising:

sintering an R—Fe—B based magnetic powder to produce a sintered magnet;

mixing $PrH_2$, Al, Cu and Ga to produce a eutectic alloy mixture;

pressing the eutectic alloy mixture by a cold isostatic pressing method;

heating the pressed eutectic alloy mixture to produce a eutectic alloy;

infiltrating the eutectic alloy into the sintered magnet, wherein the eutectic alloy contains Pr, Al, Cu and Ga, wherein R in the R—Fe—B based magnetic powder is Nd, Pr, Dy, Ce or Tb, and wherein infiltrating the eutectic alloy comprises:

applying the eutectic alloy to the sintered magnet; and heat-treating the sintered magnet to which the eutectic alloy is applied.

2. The method of claim 1, wherein:

heat treating the sintered magnet comprises heating the sintered magnet to 500 to 1000 degrees Celsius.

3. The method of claim 1, wherein:

heat treating the sintered magnet treatment step comprises:

a primary heat treatment step of heating the sintered magnet to 800 to 1000 degrees Celsius; and a secondary heat treatment step of heating the sintered magnet to 500 to 600 degrees Celsius.

4. The method of claim 1, further comprising:

synthesizing the R—Fe—B based magnet powder by a reduction-diffusion method.

5. The method of claim 1, wherein:

the eutectic alloy has a Ga content of 1 to 20 at %.

6. The method of claim 1, wherein:

the R—Fe—B based magnet powder comprises an NdFeB based magnet powder.

* * * * *